April 14, 1953 E. F. KINGSLEY 2,635,196
ELECTRIC LOAD STABILIZER
Filed June 2, 1952 2 SHEETS—SHEET 2

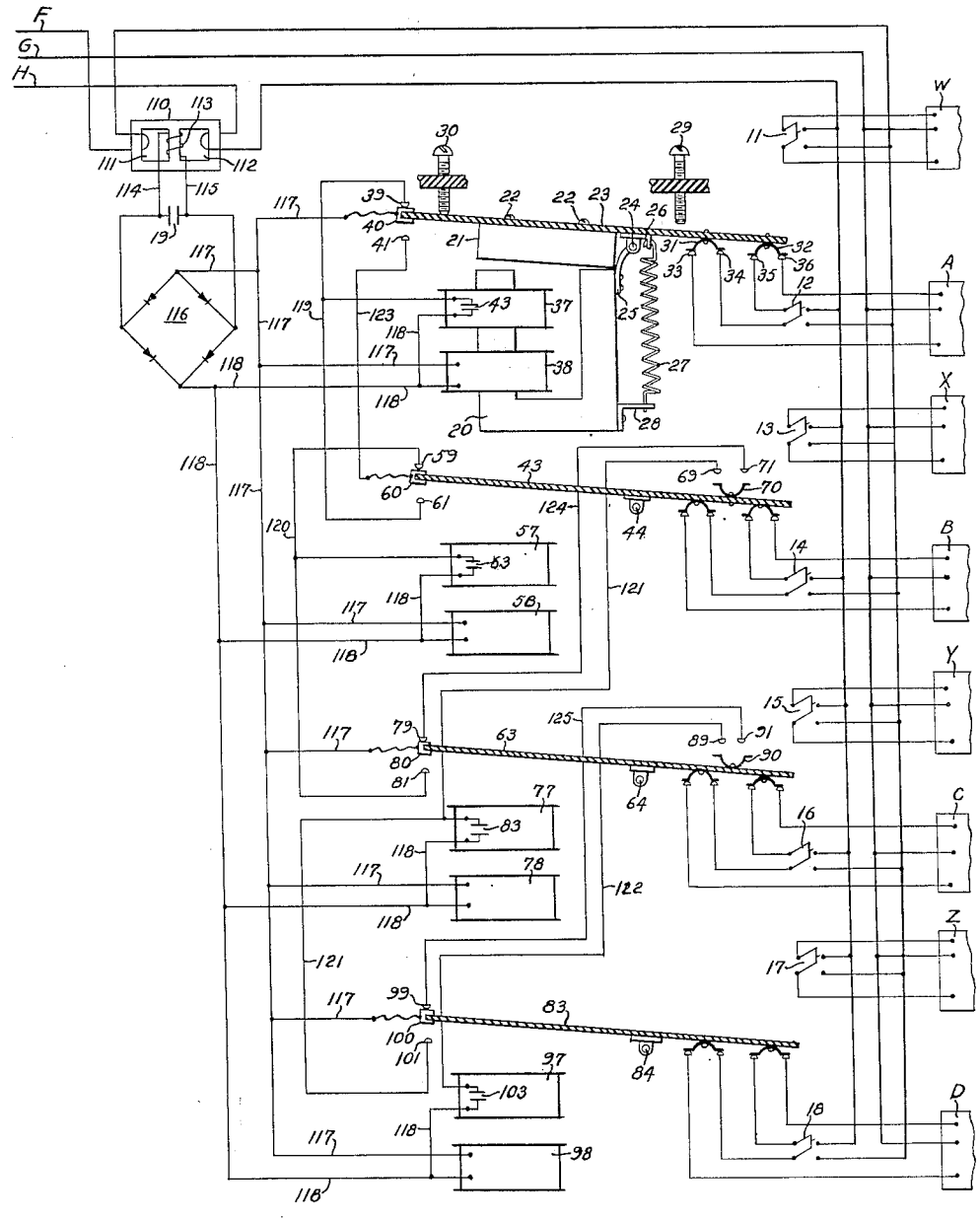

INVENTOR
Errol F. Kingsley
BY
AGENT

Patented Apr. 14, 1953

2,635,196

UNITED STATES PATENT OFFICE 2,635,196

ELECTRIC LOAD STABILIZER

Errol F. Kingsley, Portland, Oreg., assignor to Iron Fireman Manufacturing Company, Portland, Oreg.

Application June 2, 1952, Serial No. 291,263

18 Claims. (Cl. 307—35)

1

This invention pertains to over-current and under-current relaying means and particularly relates to an improved all electric means for maintaining a high load factor on an electric system in combination with a low demand factor.

This application is a continuation in part of my co-pending application, Serial No. 176,618, filed July 29, 1950, on an Electric Load Limiter, over which this invention is an improvement.

It should be understood that to encourage the best possible use of its distribution plant, it is common practice for an electric utility company to offer its customers electric power service at the lowest kilowatt hour rate consistent with its costs and that to make this low rate possible a reasonably high ratio of average load to peak load must be maintained by the customer. Because of this it is common practice for the utility company to make an additional charge commonly called a demand charge on the basis of the extent that the customer's electric load during a given pay period exceeds for a reasonable time, a reasonable limit which the utility company sets. In many cases the utility company makes this surcharge or demand charge based on a fixed rate per kilowatt of excess load over ten kilowatts maintained for any fifteen minute period during the month being billed.

Further it should be understood that in the average household the uses of electricity are diverse and the use of electricity in most of the electrical apparatus is intermittent. Also it should be understood that the intermittent use of electricity in most of the electrical apparatus is automatically controlled in accordance with need so that even when the particular apparatus is in use it is only actually connected and drawing electric power a small part of the time. In electrically heated homes for instance it may be possible to connect as much as 30 or 40 kilowatts of load to the electric service, yet the peak load will not exceed 10 kilowatts for any one quarter hour period.

It is therefore seen that to encourage the use of electricity and to develop this increased load on a high load factor basis which will be economical for the customer and profitable for the utility company it has long been desired to have available some means for making it possible to connect a variety of electric loads to the power line without intermittently developing undesired excessive load peaks.

It is the principal object of my invention to provide a means for accomplishing this result.

It is also a primary object to accomplish this result with a minimum of equipment which is low in first cost, simple to install and entirely automatic in operation.

It is a second object to provide means for disconnecting from the electric service a plurality of electric loads of different relative importance in the inverse order of their relative importance when the total current being supplied by the electric lines is above one pre-set value and to reconnect these electric loads of different relative importance to the electric service lines in the order of their relative importance when the total current being supplied by the electric service lines is below an other pre-set value.

It is a third object to provide wholly electric means for accomplishing the desired result.

How these and other objects are attained is explained in the following description of the apparatus of my invention referring to the attached drawings, in which Fig. 1 is a schematic showing of the mechanisms and circuits of my invention.

In the several figures of the drawings like reference numerals indicate like parts.

Figure 5:
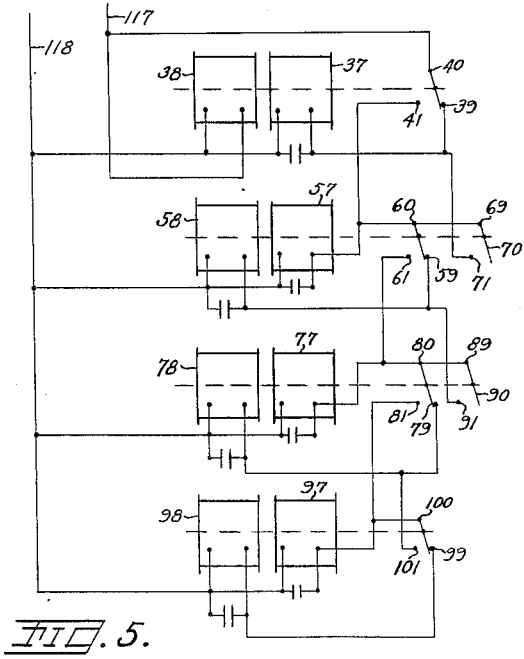
Figs. 3, 4 and 5, show some of the possible variations of the control circuit of this invention.

Referring now to the drawings, Fig. 1 is a schematic diagram showing how the essential circuits and parts of a preferred form of the electric load stabilizer of my invention are used in an installation including a series of electric loads W, X, Y and Z, of equal and primary importance and a series of electric loads, A, B, C and D of secondary importance and of unequal relative importance connected as shown to a source of electric power (not shown) through the three electric service lines F, G, and H.

For practical illustration it is assumed that the power source supplies 220 volt, 60 cycle, alternating current to lines F and H and that line G is grounded and maintained at 110 volts from line F and 110 volts from line H.

Switches 11, 12, 13, 14, 15, 16, 17, and 18 are connected respectively as shown to connect the several electric loads to the electric service lines in accordance with the need for power availability at the several loads. While these switches are shown as manually operated D. P. S. T. switches it is understood that these switches in practice may be automatic in operation and condition responsive. For instance, load W might be the entire lighting service to a home, while load X might be an automatically maintained water supply, load Y might be an electric cooking range, and load Z might be an electric water heater. Loads A, B, C, and D might then be thermostatically controlled electric elements for house heating which could well be dispensed with intermittently for short periods of time in the inverse order of their importance should it so happen that the demands of the more important loads approached the demand penalty limit shown in the utility company's rate schedule used. Of the dispensible loads the order of their relative importance would be D, C, B, and A or their inverse order of relative importance (or dispensible order) would be A, B, C, and D.

In my system, for each of the loads A, B, C, and D, as typically illustrated for load A, I have supplied an electric motor, or magnetic, operator having a stator 20 and an armature 21 to which is attached by screws 22 an insulating switch bar 23, the armature 21 being hinged to stator 20 by hinge pin 24 engaging hinge clips 25 and 26 secured to stator 20 and bar 23 respectively. Tension spring 27 strained between clip 26 and clip 28 secured to stator 20 biases armature 21 in a blockwise direction. Adjustable stops 29 and 30 limit the movement of armature 21 in the counter clockwise and clockwise directions respectively.

Conducting bridges 31, 32, carried on bar 23, together with stationary contacts 33, 34, 35, and 36, form a normally closed switch adapted to disconnect or reconnect load A from or to line wires F and H in accordance with the positioning of armature 21 as influenced by the degree of energization of actuating coils 37 and 38 and the consequent effort of the magnetic circuit through stator 20 and armature 21 to decrease its length against the opposition of spring 27.

As its left end switch bar 23 carries movable contact 40 which with its associated contacts 39 and 41 form an auxiliary S. P. D. T. control switch. Condenser 43 is connected across the terminals of coils 37.

A similar magnetic operator to the one above described for load A is provided for each of the loads B, C, and D but in the interest of simplification and ease of reading the drawing the stator, armature, stator clips and spring have been omitted in the latter load control units. However, it is understood that switch bar 43 of load B is normally biased in a clockwise direction to the closed position of the load switches as shown but that it can be moved in a counter clockwise direction on sufficient energization of actuating coils 57, 58. Also bar 43 carries moving contact 60 of S. P. D. T. switch 59, 60, 61, at its left end.

Similarly switch bar 63 of load C is normally biased in a clockwise direction to the close position of its load switches as shown but that it can be moved in a counter clockwise direction on sufficient energization of actuating coils 77, 78. Also bar 63 carries moving contact 80 of S. P. D. T. switch 79, 80, 81 at its left end.

And similarly switch bar 83 of load D is normally biased in a clockwise direction to the closed position of its load switches as shown but that it can be moved in a counter clockwise direction on sufficient energization of actuating coils 97, 98. Also bar 83 carries moving contact 100 of S. P. D. T. switch 99, 100, 101 at its left end.

It should be noted that bars 43 and 63 of intermediate loads B and C respectively additionally carry at their right ends bridging members 70 and 90 S. P. D. T. switches 69, 70, 71 and 89, 90, 91, respectively.

Current transformer iron core 110 has two windows 111, 112, through the first of which line wire F is threaded and through the second of which is threaded line wire H. The secondary winding 113 of the current transformer is wound on the center leg of the current transformer as shown and has its terminals connected by wire 114, 115, to the opposite corners of a full wave rectifier 116 well known in the art. To the other two corners of rectifier 116 are connected the main control circuit lines 117, 118.

One terminal of each of the actuator coils 37, 38, 57, 58, 77, 78, 97 and 99 is connected to wire 118. The other terminal of coil 37 is connected to double throw switch contacts 39 and 61 by wire 119. The other terminal of coil 57 is connected to double throw switch contacts 59 and 81 by wire 120. The other terminal of coil 77 is connected to switch contacts 69 and 101 by wire 121. The other terminal of coil 97 is connected to switch contact 89 by wire 122. And the other terminals of coils 38, 58, 78, and 98 are connected to main control wire 117. Wire 123 connects switch contacts 41 and 60. Wire 124 connects switch contacts 71 and 79. Wire 125 connects switch contacts 91 and 99. Switch contacts 40, 80, and 100, are connected to wire 117.

Figure 2:
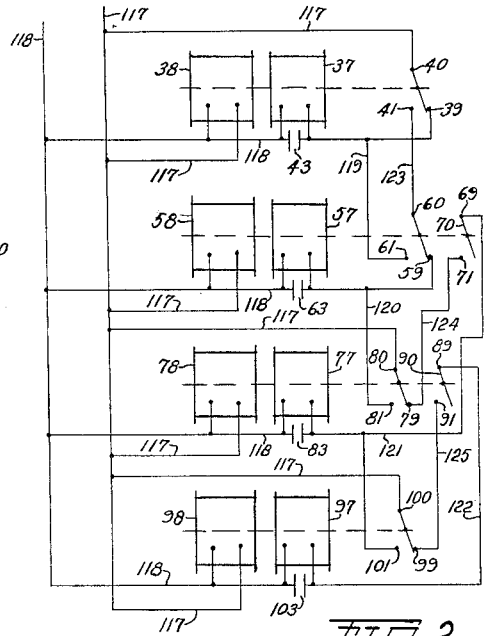
Fig. 2 is a schematic circuit drawing of the preferred form of the control circuits of the apparatus of my invention.

Figure 2 is a simplified schematic drawing of the actuator coils, auxiliary control switches and control circuit wiring of the preferred form of my system shown more completely in Figure 1.

In Figs. 1 and 2 condensers 43, 63, 83, and 103 are connected across the terminals of actuator coils 37, 57, 77, and 97 respectively for the purpose of reducing the switch arcing energy and for supplying instantaneous holding energy to their respective coils when these coils are individually switched from the circuit of the main control wires by the appropriate auxiliary switch.

Condenser 19 is shown in Fig. 1 to be connected across the secondary terminal wires 114, 115 of the current transformer where it accomplishes a new and unexpected but highly practical result. It is well known that the secondary voltage of a current transformer with a specified load varies with the primary current. It is also well known that if the secondary winding is not loaded, dangerously large voltages may appear at the secondary terminals. It is required in wiring instruments of this type for general use that if the control voltage exceeds a specified voltage the spacing and insulation in the control circuit must come under a "high voltage" requirement while if the voltage never exceeds the specified voltage a "low voltage" requirement is enforced. Also if in wiring it is possible that the wireman might open the secondary winding with current going through the primary winding a special requirement of a properly marked and supplied short circuiting switch is made. After a great deal of study and experiment I have discovered that a condenser 19 permanently connected across the secondary winding of the current transformer as shown not only eliminates the possibility of over voltage should any part of the control circuit be opened inadvertently but it also prevents the control voltage from rising to the "high voltage" limit where more expensive wiring would be required. Condenser 19 accomplishes these valuable and unexpected results without interfering with the proper operation of my system.

The operation of my system as shown in Figs. 1 and 2 is as follows. Assume that switches 11 to 18 are closed and that all of the loads W to Z and A to C are taking power from service wires F, G, H, in accordance with their various and varying needs.

Actuator coils 38, 58, 78, and 98, permanently connected to main control wires 117, 118 are being energized through the current transformer and rectifier 116 proportionately to the total current flowing in lines F and H. Actuator coil 37 is also energized since it is connected to wires 117 and 118 through switch contacts 39 and 40 and wire 119. Thus both actuating coils 37 and 38 of the switch operator of load A are being energized in proportion to the total current through wires F and H.

Should the total current through lines F and H exceed a first value determined by the design of the equipment and the adjustment of stop screw 30, armature 21 will be attracted to stator 20 overcoming the bias of spring 27 and the load switches of load A at the right end of switch bar 23 will be opened thus dropping load A from the system. At the same time auxiliary switch contact 40 leaves stationary contact 39 and the energizing circuit of coil 37 through wire 119 is broken. However, condenser 43 in parallel with coil 37 reduces the arc at contacts 39, 40 and discharges through coil 37 to maintain its energization for sufficient time for armature 21 to attain its maximum throw or until stopped by bar 23 striking adjustable stop 29. When auxiliary switch contact 40 "breaks" from stationary contact 39, it immediately "makes" on contact 41 and thus energizes actuator coil 57 of load B from wires 117, 118 through contacts 40, 41, wire 119, contacts 59, 60 and wire 120.

Thus should the total current through lines F and H again exceed a first value determined by the design of the equipment and the adjustment of the bar 43 stop similar to the bar 23 stop 30 actuator coils 57, 58 will have power to tip bar 43 and open its load switches to remove load B from the line.

However should the total current through lines F and H after load A is removed remain below the first pre-set value and due to the reduced demands of the various loads decrease to a second value determined by spring 27 and the holding power of coil 38 only with the air gap between armature 21 and stator 20 determined by stop 29, then spring 27 will overcome the holding power of coil 38, armature 21 will be pulled away from stator 20 the load switch of load A will be closed and the control circuits will return to their original condition with both coils 37 and 38 sensing the total current through lines F and H and ready to again remove load A on an over current condition of the lines.

Returning now to the condition with load A removed, coil 37 deenergized and coil 57 energized, it is seen that should the total load again exceed the predetermined value bar 43 will tip to the left opening the load switch of load B and closing the auxiliary switch 69, 70, 71 to energize coil 77 from wires 117, 118 through contacts 79, 80, wire 124 switch 69, 70, 71, and wire 121. At the same time auxiliary switch contact 60 "breaks" from contact 59 thus deenergizing coil 57 and "makes" on contact 61 thus energizing coil 37 from wires 117, 118 through contacts 40, 41, wire 123, contacts 60, 61 and wire 119. In this condition load A load switch is held open by both coils 57, 37, load B load switch is held open by coil 58 and ready to close if the energization of coil 58 drops to the above noted second value, and both coils 77 and 78 are energized and ready to open the load switch of load C if the total current in lines F and H again exceeds the first value above noted and thus energizes coils 77 and 78 sufficiently to overcome the bias of the load C spring equivalent to load A spring 27.

In like manner it will be seen that with loads A and B disconnected on an over current in the service lines load C will be dropped, both coils of loads A, B and D will be energized and only coil 78 of load C will hold the load C load switch open.

Again should the total line current exceed the first over value load D will be dropped, both coils of loads A, B and C will be energized and only coil 98 of load D will be energized. Then since there are no further loads to drop the system will remain in that condition until the total current in lines F and H drops to the above noted second value when coil 98 will release its armature and the spring bias of bar 83 will again close the load D load switch and return load D to the system.

From the above it will be seen that each of the control mechanisms associated with the respective loads of relative importance are designed and adjusted to remove its load from the system in its proper order when, after the preceding load of lesser importance has been removed, the system current exceeds a pre-set value, or to reconnect its load to the system in its proper order when after the preceding load of greater importance has been connected the system current is reduced to a second pre-set value.

It is to be noted that the above explained sequential operation of the load disconnecting and re-connecting means for the loads of different relative importance is accomplished by energizing the actuating means of the load dropping means of the most important load then not connected to the system to a reduced effectiveness, energizing the actuating means of the load dropping means of the least important load then connected to the system with the full equivalent load current of the system, energizing the actuating means of the load dropping means of the other loads of different relative importance then not connected to the system with the full equivalent load current of the system, and energizing the actuating means of the load dropping means of the other loads of different relative importance then connected to the system to a reduced effectiveness.

Figure 3:
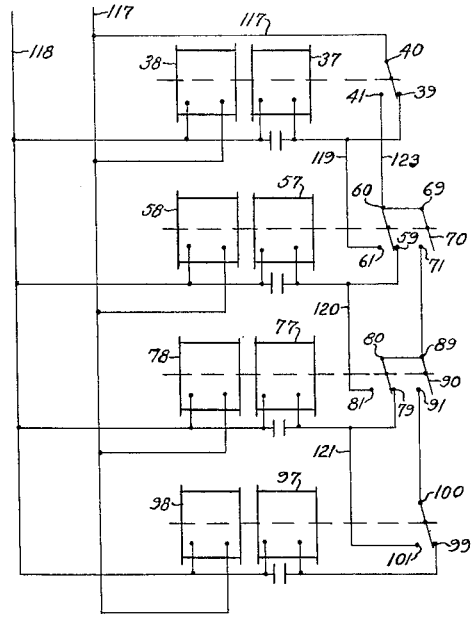
Figure 4:
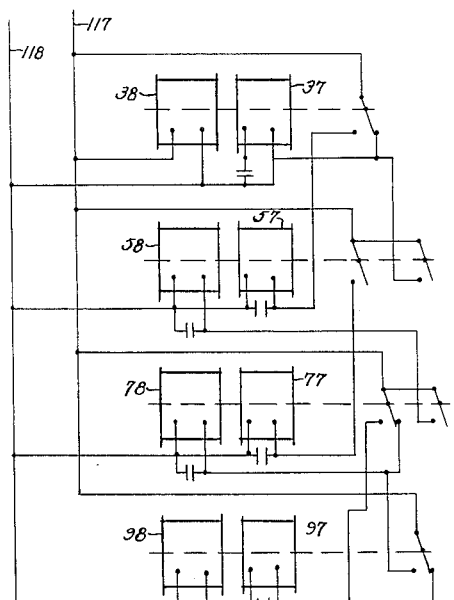

With the full disclosure as here above made of the equipment and method of operation of a preferred form of my system it is apparent that changes in the control circuits or other parts of my devices may be made without changing the generic nature of my invention. Figures 3, 4, and 5, show control circuit variations which might be used to accomplish my same results with substantially the same operating devices and auxiliary switches as are used with the preferred circuit arrangement shown in Figs. 1 and 2.

For example, in Fig. 3 is shown a variation of the control circuits of Fig. 2 in which exactly the same result is accomplished with exactly the same sequence of operation of the same actuating coils and the same auxiliary switches. As in Fig. 2 in Fig. 3 actuating coils 38, 58, 78, and 98 are connected to main control wires 117, 118 at all times and one terminal of each of the coils 37, 57, 77, and 97 is connected to main control wire 118 at all times. However in the control circuits of Fig. 3 the energization of each of the coils 37, 57, 77, and 97, by their respective connection to main control wire 117 is always through S. P. D. T. switch 39, 40, 41 which in its normal position with 39, 40 connected energizes coil 37 and in its operated position with 40, 41 connected gives continuity to line 117 for subsequent sequential operation of the control system.

In Fig. 4 is shown another control circuit scheme in which the timing and effectiveness of the two coil actuator connection and disconnection is the same as for Figs. 2 and 3 but in which for loads beyond load A the individual coils of each two coil actuator are alternately disconnected from main control lines 117, 118 and because both coils are switched condensers are connected individually across both coils.

In Fig. 5 is shown still another control circuit scheme which can be used but which is less desirable and required greater care in adjustment because it entails a greater variation in current transformer burden as the control runs its complete gamut of sequential switching. In Fig. 5, coil 38 is permanently connected to main control lines 117, 118 and in the normal conditions shown with all loads A, B, C, and D, connected to the system, coil 37 is also connected. In this condition only two coils 37, 38 make up the current transformer secondary burden while in Figs. 2, 3, and 4, the secondary burden includes five coils at this stage of operation of the system.

When coils 37, 38 are sufficiently energized to drop load A and operate switch 39, 40, 41, in Fig. 5 coil 37 is dropped and coils 57, 58 are energized thus giving the current transformer a secondary burden of three coils while at this same stage of operation of the system the burden is five coils in Figs. 2, 3 and 4.

When coils 57, 58 are sufficiently energized to drop load B and operate switches 59, 60, 61 and 69, 70, 71, coil 58 is dropped and coils 37, 77, and 78 are energized thus giving the current transformer a secondary burden of five coils while at this same stage of operation of the system the burden is six coils in Figs. 2, 3 and 4.

When coils 77, 78 are sufficiently energized to drop load C and operate switches 79, 80, 81 and 89, 90, 91, coil 78 is dropped and coils 58, 97, 98 are energized thus giving the current transformer a secondary burden of seven coils while at this same stage of operation of the system the burden is also seven coils in Figs. 2, 3, and 4.

When coils 97, 98 are sufficiently energized to drop load D and operate switch 99, 100, 101, coil 98 is dropped and coil 78 is energized thus the secondary burden of the current transformer remains at seven coils at this stage of operation of the system the same as it does in Figs. 2, 3, and 4.

In my copending application above noted I have shown a species of all electric load stabilizer using two magnetic operators each with its separate actuating coil for each load to accomplish the same sequencing of load dropping and re-connecting as herein described. In this application I have disclosed and described the operation of four species of all electric load stabilizers each having a single magnetic operator equipped with two actuating coils for each load to accomplish the same sequencing of load dropping and re-connecting in accordance with the limits set for current variation desired for the system.

It is therefore apparent that my invention is generically the provision of an all electric means interposed between a system total current sensing means and multiple load disconnecting and reconnecting means to sequentially control the exclusion from, or inclusion in, the system of loads of different relative importance in the inverse order, or order, respectively, of their relative importance.

I claim:

1. In an electric system comprising a source of electric power, a plurality of electric loads, and means for connecting said electric loads to said power source, some of said electric loads being of different relative importance, means adapted continuously to sense the total current being supplied to all of said loads by said source, means adapted to disconnect said loads of different relative importance from said power source in the inverse order of their relative importance when said total current is above one pre-set value and to reconnect said loads of different relative importance to said power source in the order of their relative importance when said total current is below an other pre-set value, said disconnecting and reconnecting means comprising a switch in the circuit of each of said loads of different relative importance, an operator for each of said switches, a two part electric actuator for each of said operators, means adapting one part of each of said actuators to be connected to said sensing means substantially all of the time, and auxiliary switch means adapted to be operated by said operators to connect to said sensing means the other part of the one of said electric actuators of the one of said operators of the one of said switches in the circuit of the least important of said electric loads then connected to said power source.

2. The apparatus of claim 1 in which said auxiliary switch means includes means adapted to be operated by any one of said operators when said any one operator operates to disconnect its respective load from said power source to disconnect from said sensing means one of said parts of said electric actuator of said any one operators.

3. The apparatus of claim 1 in which said auxiliary switch means includes means adapted to be operated by any one of said operators when said any one operator operates to disconnect its respective load from said power source to connect to said sensing means both of said parts of said electric actuators of the operators of the ones of said switches in the circuits of the next less important load and the next more important load than its said respective load.

4. The apparatus of claim 3 in which said auxiliary switch means includes means operable by any one of said operators when said any one operator operates to reconnect its respective load to said power source to disconnect from said sensing means one of said parts of said electric actuators of both the operators of the ones of said switches in the circuits of the next less important load and the next more important load than its said respective load.

5. The apparatus of claim 1 in which said current sensing means includes a series connected means in the circuit from said power source to said loads.

6. The apparatus of claim 5 in which said series connected means comprises a current transformer the primary winding of which is connected in series in the circuit from said power source to said loads and circuit means adapted to connect the secondary winding of said current transformer to said auxiliary switch means.

7. The apparatus of claim 6 in which said circuit means includes a rectifier adapted to convert alternating current to direct current.

8. The apparatus of claim 6 including an electric condenser connected in parallel with the secondary winding of said current transformer, said condenser being adapted to limit the voltage at the secondary terminals of said transformer.

9. The apparatus of claim 5 in which said series connecting means comprises a current transformer having two primary windings and one secondary winding, each of said primary windings being connected in series in a separate wire of the circuit from said power source to said loads.

10. The apparatus of claim 1 in which said operators each comprise a stator part and an armature part, said armature being adapted to move under the influence of said electric actuators, and a pair of stops, one of said stops being adjustable to limit the motion of said armature in one direction to determine said one pre-set value of said current, and the other of said stops being adjustable to limit the motion of said armature in another direction to determine said other pre-set value of said current.

11. In an electric system comprising a source of electric power, a plurality of electric loads, and means for connecting said electric loads to said power source, some of said electric loads being of different relative importance, means adapted continuously to sense the total current being supplied to all of said loads by said source, means adapted to disconnect said loads of different relative importance from said power source in the inverse order of their relative importance when said total current is above one pre-set value and to reconnect said loads of different relative importance to said power source in the order of their relative importance when said total current is below an other pre-set value, said disconnecting and reconnecting means comprising a normally closed switch in the circuit of each of said loads of different relative importance, operating means for each of said switches, electrical actuating means for each of said operating means and auxiliary switch means adapted to be operated by said operators, said auxiliary switch means including means adapted to connect to said sensing means the one of said electric actuating means of the one of said operators of the one of said switches in the circuit of the least important of said electric loads then connected to said power source.

12. The apparatus of claim 11, in which said auxiliary switch means includes means adapted to reduce the actuating effectivity of the one of said actuators of the one of said operators of the one of said switches in the circuit of the most important of said electric loads then not connected to said power source.

13. In an electric system comprising a source of electric power, a plurality of electric loads, and means for connecting said electric loads to said power source, some of said electric loads being of different relative importance, means adapted continuously to sense the total current being supplied to all of said loads by said source, means adapted to disconnect said loads of different relative importance from said power source in the inverse order of their importance when said total current is above one pre-set value and to reconnect said loads of different relative importance to said power source in the order of their relative importance when said total current is below an other pre-set value, said disconnecting and reconnecting means comprising a normally closed switch in the circuit of each of said loads of different relative importance and control means interposed between each of said normally closed switches and said sensing means, said control means comprising a plurality of electric motor means, an individual one of said electric motor means being associated with each individual one of said switches, each of said motor means comprising an operating means and an electric actuating means for said operating means, means adapting each of said operating means to open its respective switch when its said actuating means is energized from said sensing means to one pre-determined value and to close its respective switch when its said actuating means is deenergized to an other pre-determined value, and auxiliary switch means adapted to operate when one of said switches is opened to energize from said sensing means, the actuating means of the operating means of the switch of the next more important load whereby the actuating means of the next more important load will become effective to actuate its said operating means to open its respective switch if said total current is above said one pre-set value, and said auxiliary switch means being adapted to condition the actuating means of the said just opened switch to operate its respective operating means to close its respective switch if said total current is below said other pre-set value.

14. The apparatus of claim 13 in which said current sensing means includes a series connected element in the circuit from said power source to said loads.

15. The apparatus of claim 14 in which said series connected means comprises a current transformer the primary winding of which is connected in series in the circuit from said power source to said loads.

16. The apparatus of claim 14 in which said series connected means includes a current transformer having two primary windings and one secondary winding, each of said primary windings being connected in series in a separate wire of the circuit from said power source to said loads.

17. The apparatus of claim 15 including an electric condenser connected in parallel with the secondary winding of said current transformer, said condenser being adapted to limit the voltage at the secondary terminals of said transformer.

18. The apparatus of claim 15 in which said series connected means includes a rectifier adapted to convert part of the alternating current output of said current transformer to direct current.

ERROL F. KINGSLEY.

No references cited.